United States Patent [19]

Crews et al.

[11] Patent Number: 5,067,388

[45] Date of Patent: Nov. 26, 1991

[54] HYPERVELOCITY IMPACT SHIELD

[75] Inventors: Jeanne L. Crews, Arcadia; Burton G. Cour-Palais, Houston, both of Tex.

[73] Assignee: The United States of America as represented by the Administrator of the National Aeronautics and Space Administration, Washington, D.C.

[21] Appl. No.: 516,573

[22] Filed: Apr. 30, 1990

[51] Int. Cl.$^5$ .............................................. F41H 5/04
[52] U.S. Cl. ................................. 89/36.02; 89/36.11; 244/158 R
[58] Field of Search ........................... 89/36.02, 36.11; 244/121, 158 R, 158 A

[56] References Cited

U.S. PATENT DOCUMENTS

| 3,439,885 | 4/1969 | Sackleh | 244/1 |
| 3,575,786 | 4/1971 | Baker et al. | 161/165 |
| 3,771,418 | 11/1973 | Gulbierz et al. | 89/36.02 |
| 4,198,454 | 4/1980 | Norton | 428/117 |
| 4,323,000 | 4/1982 | Dennis et al. | 89/36.02 |
| 4,664,967 | 5/1987 | Tasdemirogul | 428/220 |

FOREIGN PATENT DOCUMENTS 579764  9/1976  Switzerland .................. 89/36.02

OTHER PUBLICATIONS

"Development of Dual Bumper Wall Construction for Advanced Spacecraft", A. J. Richardson and J. P. Sanders, Journal of Spacecraft and Rockets, vol. 9, #6, Jun. 1972, pp. 448-451.

Primary Examiner—Stephen C. Bentley
Attorney, Agent, or Firm—Russell E. Schlorff; Harold W. Adams; Edward K. Fein

[57] ABSTRACT

A hypervelocity impact shield 10 and method for protecting a wall structure, such as a spacecraft wall 12, from impact with particles of debris having densities of about 2.7 g/cm$^3$ and impact velocities up to 16 km/s. The shield comprises a stack of ultra thin sheets 11 of impactor disrupting material supported and arranged by support means 13 in spaced relationship to one another and mounted to cover the wall 12 in a position for intercepting the particles. The sheets 11 are of a number and spacing such that are impacting particle 15 and the resulting particulates of the impacting particle and sheet material are successively impact-shocked to a thermal state of total melt and/or vaporization to a degree as precludes perforation of the wall. The ratio of individual sheet thickness to the theoretical diameter of particles of debris which may be of spherical form is in the range of 0.03 to 0.05. The spacing between adjacent sheets is such that the debris cloud plume of liquid and vapor resulting from an impacting particle penetrating a sheet does not puncture the next adjacent sheet prior to the arrival thereat of fragment particulates of sheet material and the debris particle produced by a previous impact.

10 Claims, 2 Drawing Sheets

HYPERVELOCITY IMPACT SHIELD

ORIGIN OF THE INVENTION

The invention described herein was made by employees of the United States Government and may be manufactured and used by or for the Government of the United States of America for governmental purposes without the payment of any royalties thereon or therefor.

FIELD OF THE INVENTION

The invention relates to a hypervelocity impact (HVI) shield and method for shielding a wall from particle impacts, and more particularly to a shield comprised of a series of ultra thin sheets of HVI impactor disrupting material of a thickness and spacing arranged to protect against particles having densities of about 2.7 g/cm$^3$ and with impact velocities up to 16 km/s by the process of successively shocking the particle material to a higher thermal state of melt or vaporization.

BACKGROUND OF THE INVENTION

Space operations involving space stations and long duration space flights have created an awareness of the critical need to protect spacecraft structures from the hazard presented by orbital debris. While shielding schemes devised for protecting against micrometeoroids have met with success, the problem of defending against the more dense and slower moving particles of orbital debris has not heretofore been satisfactorily solved. These particles have densities of about 2.7 g/cm$^3$ and impact velocities up to 16 km/s as compared with densities of about 1 g/cm$^3$ and average impact velocities of 20 km/s for micrometeoroids. Previous schemes for protecting against the typically slower particles of orbital debris have included single sheet shields and dual or multi-layered shields for protecting a wall. The sheets in these prior art schemes are often characterized as "thin" with a ratio of sheet thickness ($t_s$) to the theoretical diameter ($d_p$) of a spherical impacting particle which is in the range of 0.15 to 0.25. With such shields, each sheet adds material to the debris plume which can damage the back wall. They also produce secondary ejecta into the space environment where they pose additional hazards to space vehicles or other space structures in the line-of-sight of their trajectory.

For a conventional hypervelocity shield concept or design which consists of a single or multi "thin" sheet shield, the orbital debris upon impact typically fragments into a large number of fine solid debris projectiles that are hot but not molten. In their contact with subsequent "thin" sheets of the shield, more mass is added to the debris plume by the impact process with the result that each "thin" sheet does not assist the process of destruction as much as it adds more destructive material to impact the next sheet. In most instances, each of these "thin" sheets acts as a "choke" to constrain the debris or cloud plume from expanding. The net effect is the need for a very thick spacecraft wall to defeat the debris energy.

A paper entitled, "Development of Dual Bumper Wall Construction for Advanced Spacecraft" by A. J. Richardson and J. P. Sanders appearing in the JOURNAL OF SPACECRAFT AND ROCKETS, Vol. No. 6, June 1972 discloses a multi-sheet shield and recognizes that a second sheet can fragment the fragments created by the first sheet, thereby allowing for a reduction in wall thickness. The first sheet is characterized by a ratio of sheet thickness to particle diameter equal to 0.13 and the failure mode of the wall is changed to "bulge and tear" rather than perforation.

In the patented prior art, U.S. Pat. No. 3,439,885 discloses a protective shield for spacecraft which comprises a thin outer wall and layer of bronze wool secured to the outer surface of a load-carrying structural wall of the spacecraft.

U.S. Pat. No. 3,575,786 discloses a shield interlayer for spall suppression which comprises a nylon felt layer adjacent the inner surface of the shield and a urethane elastomer of high elasticity and tear resistance which is bonded over the surface of the felt layer.

U.S. Pat. No. 3,771,418 discloses an anti-spall lightweight armor which includes a shock absorbent layered combination of fiber glass materials with a resinous bonding material.

U.S. Pat. No. 4,198,454 discloses a lightweight composite shield for resisting penetration by small arms projectiles which comprises a first panel of a multi-layered construction of metal panels spaced by a honeycomb structure filled with a subliming material, a further panel of projectile resisting material, and thermal insulation material disposed therebetween.

U.S. Pat. No. 4,664,967 discloses a ballistic spall liner in the form of a laminate of layers of high tensile strength woven fabric bonded together with at least one reinforcing layer of martensite sheet steel which is interposed between the woven fabric layers.

While these prior art schemes are successful in defending a wall structure from impacting projectiles of many types, none are satisfactory (weight-wise) for protecting against orbiting particles with densities of about 2.7 g/cm$^3$ and impact velocities up to 16 km/s.

SUMMARY OF THE INVENTION

The present invention relates to a hypervelocity impact shield and method for protecting a wall structure, such as a spacecraft wall, from impact with particles of debris having densities of about 2.7 g/cm$^3$ and impact velocities up to 16 km/s. The shield comprises a series of ultra thin sheets of HVI impactor disrupting material supported and arranged in spaced relationship to one another and mounted to cover the wall structure in a position for intercepting debris particles. The sheets are of a number and spacing such that the impacting particles and the resulting particulates of the impacting particles and sheet material are successively impact-shocked to a thermal state of total melt and/or vaporization to a degree as precludes perforation of the wall structure. The ratio of individual sheet thickness to the theoretical diameter of particles of debris which may be of spherical form is in the range of 0.03 to 0.05. The spacing between adjacent sheets is such that the debris cloud plume of liquid and vapor resulting from an impacting particle penetrating a sheet does not puncture the next adjacent sheet prior to the arrival thereat of fragment particulates of sheet material and the debris particle produced by a previous impact.

The present invention has universal HVI application in preventing particulate penetration of a wall structure.

DETAILED DESCRIPTION OF THE INVENTION

In planning for space missions which involve long duration space flights and permanently orbiting structures such as space stations and satellites, design engineers are faced with the problem of defending such structures from impact with particles of orbital debris. While satisfactory solutions have been found for shielding from micrometeoroids with typical densities of about 1 g/cm$^3$ and average velocities of 20 km/s, hitherto proposed solutions for defending large, long-duration spacecraft against the slower, larger and more dense debris particles are prohibitively weighty. Practically all such shielding concepts for defending against these particles with densities of about 2.7 g/cm$^3$ and maximum impact velocities up to 16 km/s, involve a weight penalty which is becoming prohibitive for space operations. When standard 2 sheet, metallic shields are employed, impacts by these slower, more dense debris particles can produce damaging spall consisting of particles of the impacting particle and target material which can penetrate or severely damage the spacecraft to be protected. The debris particles also produce dangerous secondary ejecta consisting of particulates of the impacting projectile particles and target material which are ejected into the space environment and have potential for impacting and damaging any spacecraft element in the line-of-sight of their trajectory and can in many cases remain on orbit long enough to become an additional debris threat.

The shielding concept of the present invention is designed to impose a minimal weight penalty while providing effective shielding with an associated minimum production of damaging ejecta and spall.

Figure 1:
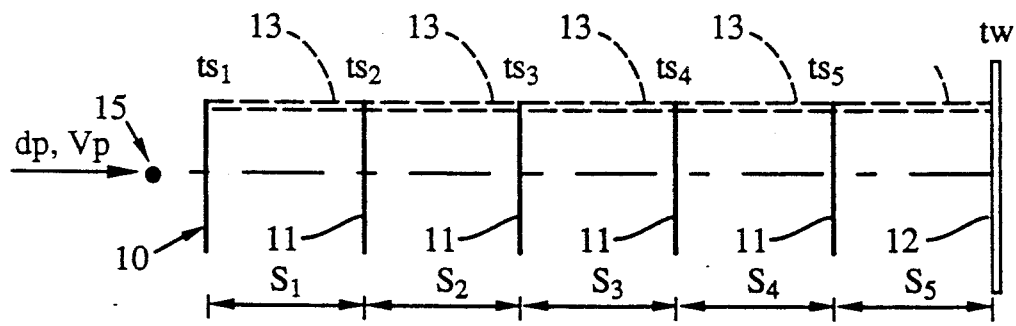
FIG. 1 is a schematic illustration of the concept geometry of the invention showing the arrangement of shield elements and the variables involved in the configuration of the shield of the invention.

The concept geometry of a preferred embodiment of the invention is illustrated in FIG. 1 wherein a hypervelocity shield 10 is provided by a plurality of "very thin" sheets 11 of impactor disrupting material, such as aluminum, which are arranged in a multi-layered array before a wall or wall structure 12 to be protected. The shield 10 is mounted on the wall 12 and the sheets 11 maintained in fixed spaced relation to one another by appropriate support structures 13. The sheets 11 are of a thickness such that the ratio (ts/dp) of sheet thickness ts to the theoretical diameter dp of a spherical debris particle 15 or the length of a cylindrical particle to be protected against is in the range of 0.03 to 0.05, such sheets being defined herein as "ultra thin" sheets. The arrangement is characterized by a uniform spacing of the sheets 11 from one another and the wall 12 from the adjacent sheet 11.

The shield concept of the invention described herein is designed to produce the successive impact shocking of an impacting particle and its resulting particulate fragments such that all of the material of which the original impacting particle is comprised is raised to the higher thermal state of total molten condition and/or vaporization as will preclude a puncture of the wall to be protected. In operation, the outermost sheet 11 of the stack which first intercepts a debris particle, breaks the impacting particle projectile into smaller "sub-projectiles" that have been heated by the impact pressure to a very high temperature. These "sub-projectiles" then impact the subsequent second sheet to produce further "sub-projectiles" to impact with the third sheet, and so on, in a process of successive impacts with the evenly spaced sheets which raises all of the impacting material to a successively higher degree of melt and eventual total vaporization if enough sheets are used. In general, the number of sheets required to protect most structures will be less than the number required for total vaporization of impacting material. Since the sheets are very thin with a ts/dp ratio in the range of 0.03 to 0.05, they are easily broken through without adding much mass to the projectile/shield debris plume of liquid and vapor generated by the impact phenomenon.

With reference to FIG. 1, it is to be observed that there are several potential variables to be considered in design of a shield in accordance with the concept described above. Notably, these are the first sheet thickness, the intermediate sheet thicknesses, the number of sheets required to produce a total melt of the particle projectile, the thickness of the wall, the spacing of each element, and the materials involved.

Since the concept of the present invention was discovered and developed through testing in a research program, the experimental procedures which were followed and the test results are included herein for providing a more detailed explanation and better appreciation of the invention.

The development tests were conducted at a hypervelocity impact research laboratory using a 0.17 caliber light-gas gun to launch 0.32 cm diameter spherical projectiles.

The tests were performed with 0.32 cm aluminum, ruby, and copper spheres launched at velocities ranging from 2.5 km/s (for low-velocity impacts) to 7 km/s. The basic research was performed with aluminum spheres impacting normal to the target surfaces. The average velocity for the test series was 6.33 km/s with a standard deviation of 0.22 km/s. The diagnostic data on the research was obtained by using a rotating mirror framing laser shadowgraph camera capable of recording 80 frames of 35 mm film at up to two million frames per second with a 20 nanosecond exposure time. The field of view for the camera/laser system was 10 cm by 7.5 cm. The camera data was used to obtain projectile velocity, projectile integrity, "cleanness of shot" information, i.e, whether extraneous particles such as sabot or piston pieces, and the like impacted on target, to study ejecta pattern and velocity and to study debris cloud growth with respect to its shape and velocity. The camera was operated at one million frames per second during this test program. Empirical equations were developed to predict the scaling parameters and scaling tests were performed at a Hypervelocity Free-Flight Test Facility using a 1" (2.54 cm) bore light-gas gun to launch a 0.96 cm diameter spherical aluminum projectile at 7 km/s for the purpose of verifying the empirical equations and establishing the new shielding concept design criteria. Scaling tests were also performed for the multi-shock concept of the present invention using NEXTEL as the sheet material, NEXTEL being a brand name for a ceramic fabric of continuous polycrystalline metal oxide fibers which are by weight: 62% $AL_2O_3$, 14% $B_2O_3$, and 24% $S_iO_2$.

Several preliminary tests were conducted using a copper semi-infinite witness plate with the purpose of determining the degree of fragmentation caused by various single and multiple sheet shield thicknesses and from such tests it became obvious that the addition of four sheet elements to a single sheet shield effectively changes the physical state of the projectile debris.

It was observed that all the walls to be protected which were of a thickness of 0.079 cm or thinner deform under the impulsive loading from the final debris cloud of liquid and vapor generated by the multi-shock process. However if the wall is thick enough, and is made of a ductile, high-yield strength material it can deform without splitting, which limit is called the "ballistic limit". A "near" ballistic limit is used for description when there is one small perforation, (0.1 cm) and if the wall tears under the impulsive load it is said to be "petalled".

The first test series consisted of four very thin shield elements uniformly spaced, in front of a 0.16 cm element wall. In the first test, the shield elements were 0.005 cm thick, and in the other three tests one of the 0.005 cm intermediate shield elements was replaced with a 0.010 cm element. Although the position of this thicker element was varied, it was noted there was no difference in the size of the punched-out hole in the wall element. However, the holes created in the wall elements in these three tests were larger than the hole resulting from the four 0.005 cm elements.

The next series was conducted with a basic shield element thickness of 0.0102 cm and a wall thickness of 0.079 cm, cut from 6061-T6 aluminum sheet stock. Variations included the number of elements, the spacing, the thickness of intermediate elements, and the rear wall thickness and material properties.

Finally, four tests on dual sheet shields known as Whipple shields were conducted with variations involving the shield, the wall thickness and material, and the spacing. This series was done for comparison with the tests performed on shields employing the multi-shocking concept of the invention.

Three tests were included because they extended the data on the multi-shocking concept. Their purpose was to determine the limiting number of shields required to eliminate the 0.32 cm hypervelocity projectile, which turned out to be twelve shields. All these tests showed that the maximum blast damage occurred between the sixth and eighth sheet element and the remaining shield elements slowed down the residual aluminum mass.

The scaling tests that were run to verify the mass scaling using a 0.96 cm aluminum projectile at 6.7 km/s, involved both the Whipple and the multi-shocking concept. The Whipple ballistic limit turned out to be a 0.16 cm shield and a 0.32 cm 2024-T3 aluminum wall, spaced 30.48 cm apart. The multi-shock concept tests were scaled up versions of the 0.32 cm diameter test and the results verified the prediction.

In another test run with the 0.96 cm aluminum projectile at 6.5 km/s, 8 sheets of 0.0406 cm 3003-H12 aluminum shields were spaced 7.62 cm apart, with 0.229 cm 6061-T6 aluminum wall element. The wall was slightly dented, with no penetrations, and had a loose splash of molten aluminum on its surface. The intermediate shields were deformed, with large petalled holes.

ANALYSIS AND DISCUSSION

Highlights of the previously mentioned first shield screening test program, conducted to determine the fragmentation characteristics of the ultra-thin elements, are given in Table I appended below. Aluminum and copper witness plates were placed 15.24 cm behind 0.0025 and 0.0102 cm, 1100-0 aluminum shields, and the projectile was the 0.32 cm aluminum sphere. It was evident from the results that very little projectile break-up occurs with the 0.0025 cm shields as indicated by the crater depth and spall in the copper witness plate. There was little or no difference from the no-shield test, #274. On the other hand, the 0.0102 cm shields produce quite a good spread and pattern of this debris.

In Table II, appended hereto, the ballistic limit and near ballistic limit data is pulled together with two other tests that resulted in a petalled wall element for the same total mass per unit area penetrated. From columns 1 through 7, it is evident that the total distance between the first sheet and the wall element is the primary factor in determining the ballistic limit. Test #441 has fewer shields than #445, #463 and #442, yet has a marginal penetration of the wall. This is due to the doubled space (5.08 cm) between the last shield element and the wall element. On the other hand, test #444 has the same number of elements as #441, but the space between the last shield element and the wall is the standard 2.54 cm. The result is a significant tear in the wall. Further proof of the effect of spacing is provided by test #443 which has four shields, but with a higher mass per unit area. The damage to the wall is even greater than #444.

Test #444 points up the second significant factor of the multi-shock concept where it is to be noted that it is not just the total mass per unit area that is significant, it is also the number of shocks experienced by the developing debris cloud. The tests in columns 1,2 and 3 have the same mass per unit area as #443, but distributed in five elements as opposed to four. The effect that is most probably operating in this case is that the debris cloud gains additional mass by having the last shield element too thick. All of the cases discussed so far have the same wall element thickness and material.

The third significant factor that can be determined from the ballistic limits resulting from the multi-shock tests, is the deformation of the wall element. Test #965 has a 20% thinner wall than the tests that seemed to give the limiting case ballistic limits, i.e., #445, #463 and #462. However, there was enough elongation and tensile strength available in the aluminum 6061-T6 material to allow the wall to deflect without splitting.

Finally, columns 8 and 9 of Table II are ballistic limits for the Whipple configurations for comparison with the five and four element shields. The mass per unit area for ballistic limits are higher because of the predominance of solid fragments in the debris cloud. If test #965 is to be considered as the best achievable result for the aluminum multi-shock concept, it shows a 37% weight saving over the comparable dual-shield (Whipple), test #481. However, the more typical result, tests #445, #463, and #442 indicates a 29% weight saving. As the tests with the scaled up aluminum analogue were based on #445, the weight savings resulting over the comparable Whipple shield was closer to 21%.

The empirical equations that can be derived from the information given in Table 2 are as follows:

$$\{\Sigma_i^n t_s + t_w\} = \frac{C_1 \times M_p \times V_p}{(\Sigma_i^n \Delta S)^2} \times \left[\frac{2.76 \times 10^8}{Y_t}\right]^{\frac{1}{2}} ; \text{cm} \quad (1)$$

$$t_w = \frac{C_2 \times M_p \times V_p}{(\Sigma_i^n \Delta S)^2} \times \left[\frac{2.76 \times 10^8}{Y_t}\right]^{\frac{1}{2}} ; \text{cm} \quad (2)$$

where
$t_w$ = thickness of the wall structure in cm,
$m_p$ = mass of an impact particle of orbital debris in g/cm$^2$,
$V_p$ = velocity of the impacting particle of orbital debris relative to said wall structure in km/s,
$Y_t$ = yield stress of the wall material in N/m$^2$,
and $C_1$ and $C_2$ are coefficients.

The form of the empirical equations is the same as equations which have been previously developed but with the addition of a materials correction factor as follows:

$$\left[\frac{2.76 \times 10^8}{Y_t}\right]^{\frac{1}{2}}$$

Values for the coefficients $C_1$ and $C_2$ were calculated for the aluminum alloy (6061-T6) from the results of the 0.32 cm tests. Taking the average of tests #445, #463 and #442, the values of $C_1$ and $C_2$ are 73 and 44.4 cm$^3$ s/km g respectively. Equations (1) and (2) were used with these coefficients to design the aluminum analogue configurations for the scaling tests. The total thickness of shields and wall was calculated to be 0.41 cm for the five shields. From this, the thickness of the wall element came out as 0.25 cm, and each shield element (equal thickness) to 0.032 cm.

The actual test was set up with a wall thickness of 0.23 cm and six sheets each 0.032 cm for a total thickness equal to 0.421 cm which proved to be overdesigned.

It is also to be noted that two other equations can be derived from the test results summarized in Table III in terms of the total mass per unit area penetrated as follows:

$$\{\Sigma_i^n m_s + m_w\} = \frac{C_3 \times M_p \times V_p}{(\Sigma_i^n \Delta S)^2} \times \left[\frac{2.76 \times 10^8}{Y_t}\right]^{\frac{1}{2}} ; \text{gm/cm}^2 \quad (3)$$

and $$m_w = \frac{C_4 \times M_p \times V_p}{(\Sigma_i^n \Delta S)^2} \times \left[\frac{2.76 \times 10^8}{Y_t}\right]^{\frac{1}{2}} ; \text{gm/cm}^2 \quad (4)$$

The coefficients $C_3$ and $C_4$ used to design the mass scaling tests using NEXTEL as the multi-shock shield material, were the averages of tests #433 and #436, i.e., for the 0.043 g/cm$^2$ material. These coefficients are as follows:
$C_3$ = 131 s/km, and
$C_4$ = 73.4 s/km It should be noted that these values are not a simple conversion of the coefficients given for the aluminum multi-shock equations, $C_1$ and $C_2$. Being empirically derived, each set of equations stands alone.

The $C_3$ and $C_4$ coefficients for NEXTEL and other woven fabrics with different areal densities than the 0.043 g/cm$^2$ chosen for the research, can be similarly obtained by hypervelocity impact tests using a light-gas gun.
where
$m_s$ = mass per unit area of the sheet material in g/cm$^2$,
$m_w$ = mass per unit area of the wall in g/cm$^2$,
$M_p$ = mass of the impacting particle of orbital debris in g/cm$^2$,
$V_1$ = velocity of the impacting particle of orbital debris relative to said wall in km/s,
$Y_t$ = yield stress of the wall material in N/m$^2$,
and $C_1$ and $C_2$ are coefficients.

Equations (3) and (4) were used to design the tests involving the NEXTEL element multi-shock shield and were verified in the scaling tests. They are most appropriate for the design of a multi-shock shield which utilizes sheet elements of non-homogeneous material. From Table III, the following values can be found for $C_3$ and $C_4$ respectively:

| #279 | NEXTEL | 0.055 g/cm$^2$ | 79.5 | 45.3 |
| #624 | NEXTEL | 0.086 g/cm$^2$ | 45 | 30.2 |
| #727 | NEXTEL | 0.111 g/cm$^2$ | 52.7 | 32.5 |
| #726 | NEXTEL | 0.128 g/cm$^2$ | 58 | 33.6 |
| #723 | KEVLAR | 0.028 g/cm$^2$ | 318 | 180 |

The results of the research reported herein, although preliminary, can nevertheless be used for the initial design estimates of a "multi-shock" shield if the following provisos are observed:
1. The ballistic limit (failure mode) calculated by these equations is a local deformation of the wall without spall or fracture.
2. Although the equations were derived from tests in the 6 to 8 km/s velocity range they duplicate the liquid/vapor state of the debris plume and the impulsive loading condition expected for much higher velocities. The equations can be extrapolated to the maximum orbital debris relative impact velocity (15 km/s).
3. The equations should not be extrapolated below the 6 km/s as reported without further testing. At some lower velocity the debris plume will contain solid particulates and the impulsive loading criterion becomes invalid. This caveat has been demonstrated by laboratory testing at 2.7 km/s.
4. As the equations have been derived for normal impacts, the lower limiting velocity for impulsive loading (6 km/s) needs to be increased for oblique impacts, although it may be assumed that the lower limit is inversely proportional to the cosine of the impact angle.

THEORETICAL DISCUSSION

As previously mentioned, the concept of multi-shock shields has been postulated before and generally in the context that a single bumper shield could be split into two separate shields and thus be more effective. However, the uniqueness of the multi-shock shield concept of this invention is associated primarily in the use of ultra-thin sheet elements.

Figure 3:
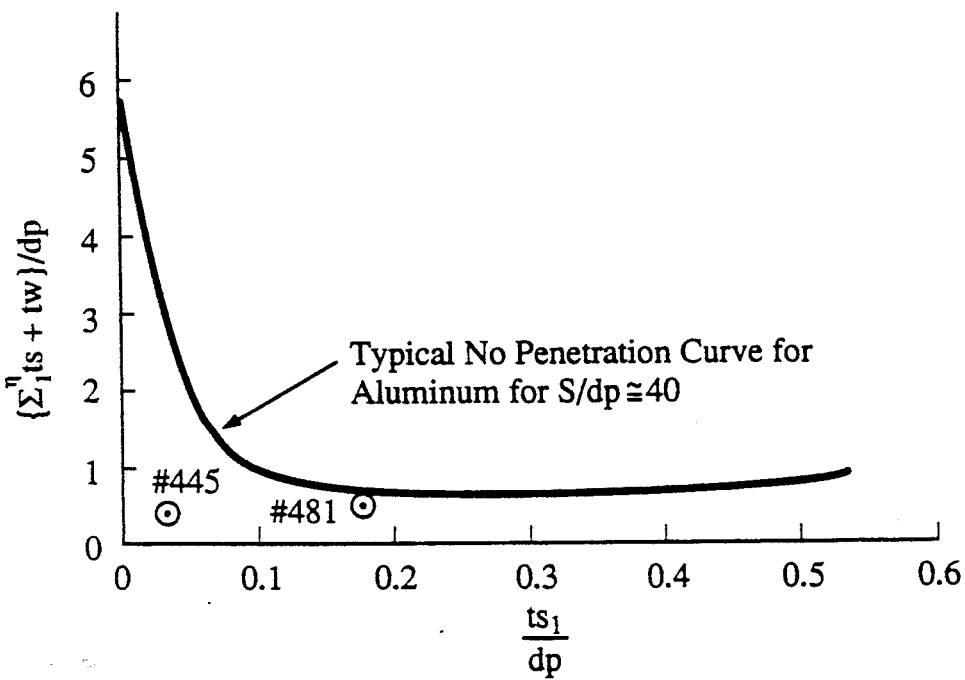
FIG. 3 is a graphical comparison of test shield designs which represents a plot of the ratio ts/dp of sheet thickness to impacting particle diameters plotted against the ratio of total thickness of the shield sheet elements and the wall to be protected to the diameter of an impacting particle.

In the past, it is to be noted that the minimum weight dual-wall sheet was obtained by designing to the lowest part of the "no penetration" curve in FIG. 3, which is a graphical comparison of test shield designs which represents a plot of the ratio $t_s/d_p$ of the first sheet thickness to impacting particle diameters plotted against the ratio of total thickness of the shield sheet elements and the wall to be protected to the diameter of an impacting spherical particle.

Generally, this meant a ts/dp of 0.15 to 0.20, and a rear sheet or wall designed by the blast equation, $(M_p \times V_p)/S^2$.

Figure 2:
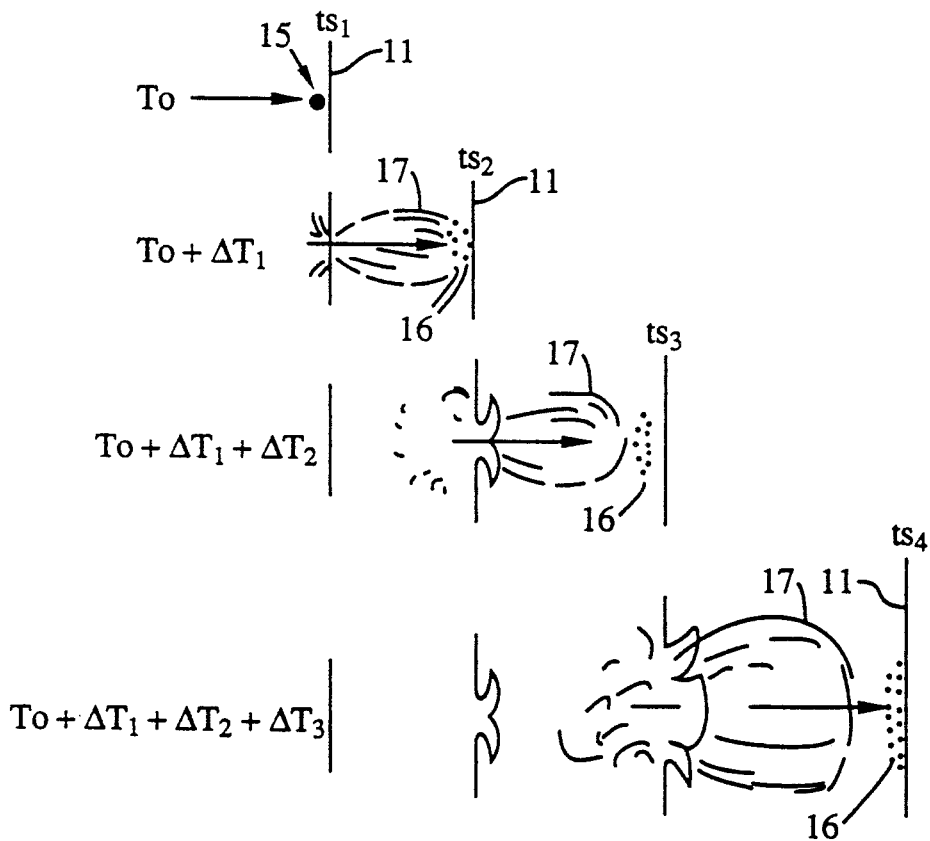
FIG. 2 is an illustration of the sequence of events which occur when a hypervelocity particle is intercepted by the shield of the invention.

The multi-shock concept of this invention relies on the projectile and shield fragments from the first element being re-shocked by the second and subsequent surfaces to raise their thermal states well beyond complete melting. In order for this to occur, the shield elements must be intact when the heated fragments are intercepted. This is accomplished by proper spacing between the shield elements, which has been demonstrated in this study. FIG. 2 is an illustration of the sequence of events when a hypervelocity projectile 15 is intercepted by a multi-shock shield configuration which generates fragments 16. The amount of new material added at each surface of a sheet 11 must be minimized, and the debris plume 17 must be allowed to expand as much as possible. Both of these factors called for ultra-thin shield elements. Theoretically, it is possible to convert the initial solid projectile into a vapor by repeating the shock process several times. This was almost accomplished in test #492 in twelve shield elements.

Figure 4:
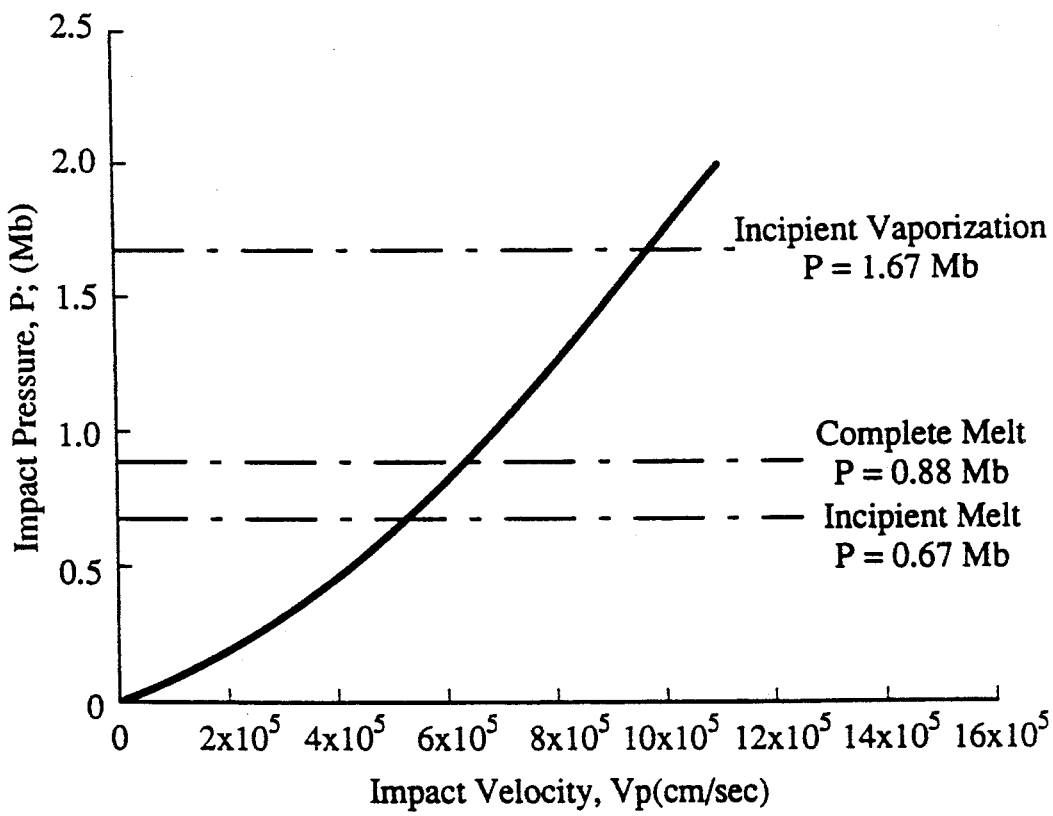
FIG. 4 is a graphical plot of ID impact pressure as a function of velocity for aluminum particles impacting aluminum sheet elements of the invention.

Although it has not been possible to derive an elegant solution involving the increase in internal energy of the projectile fragments at each shock interface, it is possible to look at the total shield geometry effect. This is done in FIG. 4, a plot of the 1D impact pressure as a function of velocity for aluminum on aluminum where "1D impact pressure" represents the instantaneous maximum pressure at impact interface as measured in megabars (Mb). The impact pressures for aluminum melting and incipient vaporization are shown as intercepts on the pressure curve. The degree of melt and thick vapor deposit seen in the tests discussed and the accompanying photos, indicate effective impact pressures greater than $1.5 \times 10^{11}$ N/m² (newtons per square meter). This in turn means that the usual 1D pressure attained at the laboratory speeds of 6.3 km/s of between 0.7 and $0.9 \times 10^{11}$ N/m² has effectively been doubled by the simple technique of multi-shocking. Also, the effective impact velocity is about 10 km/s.

While this data has dealt with the aluminum multi-shock shield, it is almost a perfect analogue for a multi-shock shield using NEXTEL elements which has about the same mass density as aluminum and performs the same way. Table III lists the significant results of tests performed on the multi-shock concept using NEXTEL and KEVLAR (a synthetic material of aramid fibers) as the shield elements with 0.32 cm aluminum projectiles at hypervelocity. As NEXTEL is a refractory material, it has a much higher melting point (1427° C.) than aluminum (650° C.). The tests show that the residue is a blackish-brown deposit, and probably a high-temperature compound of the NEXTEL components. There is very little evidence of the aluminum projectile, and it is possible that it has chemically combined with the NEXTEL under intense heat and pressure.

It was therefore noted in the research that the multi-shock shield of the present invention produces minimal secondary debris particles and most importantly significantly reduces the weight of shielding. The present invention, using aluminum sheets as an analog for comparison to a conventional dual sheet aluminum Whipple shield results in about a 30% reduction in weight.

A hypervelocity shield representative of the invention and designed for defense against a ⅛ inch (0.3175 cm) diameter aluminum sphere (45 mg density) impacting with velocities ranging from 6 to 7 km/sec is as follows:

5 sheets of 0.004 inch (1.016 mm) aluminum spaced 2.54 cm apart, defending a 0.032 inch (0.081 cm) aluminum wall.

A representative shield designed for defense against a 3/8" (9.525 mm) aluminum sphere (1.3 g density) impacting with velocities ranging from 6.5 to 6.8 km/sec is as follows:

6 sheets of 0.012 inch (0.03048 cm) aluminum spaced 7.62 cm apart, defending a 0.09 inch (0.02286 cm) aluminum wall.

It is also to be noted that the shield of the invention is readily adaptable to modularizing for ease of stowing, handling, repair, replacement or augmentation and augmentation scars for an aluminum shielding system could consist of something as simple as VELCRO, a woven and molded hook and loop fastener preferably made from NEXTEL fibers so as to be immune from atomic $O_2$ effects. The support structure for attaching the sheets to one another and the shield to the wall structure is preferably a light weight material such as a unidirectional fiber glass rod which produces non-damaging ejecta. It is also feasible that the use of NEXTEL would provide additional thermal and radiation insulation capability.

It is therefore to be appreciated that the multi-shock shield of the present invention is a significant weight improvement over the earlier proposed methods of defending against projectiles with densities of about 2.79 g/cm³ and relative impact velocities up to 16 km/s. A unique feature of the invention is the utilization of a multi-shock shielding technique where ultra-thin spaced, shield elements are provided to repeatedly shock state the impacting projectile to a high enough energy state to cause its melting and vaporization at relatively lower velocities than that which would normally produce these results.

It is also to be understood that the foregoing description of the invention has been presented for purposes of illustration and explanation and is not intended to limit the invention to the precise structures and materials disclosed herein for practicing the invention. For example, it is possible to vary the spacing between the individual sheets 11 and to use other impactor disrupting materials for the sheets. It is to be appreciated therefore that changes may be made by those skilled in the art without departing from the spirit of the invention.

TABLE 1

| | | | | | FIRST SHIELD SCREENING TESTS | | | | |
|---|---|---|---|---|---|---|---|---|---|
| | | THICK- | AREAL | | | WITNESS SHEET | | WITNESS SHEET DAMAGE | |
| TEST # | VELOCITY $V_p$; (km/s) | NESS $t_s$; (cm) | DENSITY $m_s$; (g/cm²) | $t_s/d_p$ | SPACING S; (cm) | MATERIAL | THICK- NESS | FRONT (cm) | REAR |
| 274 | 6.73 | 0 | 0 | 0 | 15.2 | COPPER 99.95% | 1.27 | ONE 12 mm CRATER | ATTACHED SPALL |

TABLE 1-continued

| | | | | FIRST SHIELD SCREENING TESTS | | | | |
|---|---|---|---|---|---|---|---|---|
| | | THICK- | AREAL | | | WITNESS SHEET | | WITNESS SHEET DAMAGE |
| TEST # | VELOCITY $V_p$; (km/s) | NESS $t_s$; (cm) | DENSITY $m_s$; (g/cm$^2$) | $t_s/d_p$ | SPACING S; (cm) | MATERIAL | THICK- NESS | FRONT (cm) | REAR |
| 265 | 6.41 | .0025 | .007 | .008 | 15.2 | COPPER 99.95% | 1.27 | ONE 11.5 mm CRATER | ATTACHED SPALL |
| 267 | 6.41 | .0025 | .007 | .008 | 15.2 | COPPER 99.95% | 1.27 | ONE 11.5 mm CRATER | ATTACHED SPALL |
| 258 | 7.03 | .0025 | .007 | .008 | 15.2 | ALUMINUM 1100-F | 1.27 | ONE 18 mm CRATER | DETACHED SPALL; 7 mm DIA |
| 262 | 6.67 | .0102 | .028 | .032 | 15.2 | COPPER 99.95% | 1.27 | ONE 7 mm MANY 2.4 mm CRATERS | IRREGULAR BUMPS |
| 247 | 6.41 | .0102 | .028 | .032 | 15.2 | ALUMINUM 1100-F | 1.27 | NINE >4 mm CRATERS | NEARLY DE- TACHED SPALL; 1.5 cm DIA |

PROJECTILE: DIAMETER, $d_p$ = 0.32 cm: MATERIAL = ALUMINUM 1100-0
SHIELD: THICKNESS, $t_s$ = (AS SHOWN): MATERIAL = ALUMINUM 1100-0

TABLE 2
COMPARISON OF SIGNIFICANT 0.32 cm HYPERVELOCITY ALUMINUM DATA
PROJECTILE: 2017 ALUMINUM

| | #445 | #463 | #442 | #965 | #441 |
|---|---|---|---|---|---|
| SHIELDS, n (cm) | 5 × .0102 | 5 × .0102 | 5 × .0102 | 5 × .0102 | 4 × .0102 |
| $t_s/d_p$ | .032 | .032 | .032 | .032 | .032 |
| WALL, $t_w$ (cm) | .079 | .079 | .079 | .064 | .079 |
| Σ m; (g/cm$^2$) | .361 | .361 | .361 | .320 | .334 |
| Σ$t$S; (cm) | 12.7 | 12.7 | 12.7 | 12.7 | 12.7 |
| VELOCITY, $V_p$; (km/s) | 6.32 | 6.19 | 6.29 | 6.49 | 6.37 |
| WALL, $Y_w$; (N/m$^2$) | 2.76 × 10$^8$ | 2.76 × 10$^8$ | 2.76 × 10$^8$ | 2.76 × 10$^8$ | 2.76 × 10$^8$ |
| WALL CONDITION | DIMPLED; INTACT | DIMPLED; INTACT | DIMPLED; 1 PERF .1 cm DIA | DIMPLED; INTACT (but CLOSE) | DIMPLED; 1 PERF .1 cm DIA |

| | #443 | #444 | #481 | #240 |
|---|---|---|---|---|
| SHIELDS, n (cm) | 3 × .0102 1 × .0203 | 4 × .0102 | 1 × .056 | 1 × .081 |
| $t_s/d_p$ | 0.32 | .032 | .176 | .256 |
| WALL, $t_w$ (cm) | .079 | .079 | .127 | .127 |
| Σ m; (g/cm$^2$) | .361 | .334 | .509 | .579 |
| Σ$t$S; (cm) | 10.16 | 10.16 | 12.7 | 10.16 |
| VELOCITY, $V_p$; (km/s) | 5.90 | 6.37 | 6.38 | 6.58 |
| WALL, $Y_w$; (N/m$^2$) | 2.76 × 10$^8$ | 2.76 × 10$^8$ | 2.76 × 10$^8$ | 3.45 × 10$^8$ |
| WALL CONDITION | PETALLED; HOLE .8 cm DIA | DIMPLED; TEAR .5 cm × .2 cm | FLAT; INTACT (1 SPALL POP) | FLAT; INTACT |

TABLE 3
COMPARISON OF SIGNIFICANT cm HYPERVELOCITY NEXTEL DATA
PROJECTILE: 2017 ALUMINUM

| | #723 | #433 | #436 | #731 | #729 |
|---|---|---|---|---|---|
| SHIELDS, n (g/cm$^2$) | 6 × .028 | 4 × .043 | 4 × .043 | 3 × .043 | 3 × .055 |
| $m_{sl}/(pd)_p$ | .032 | .050 | .050 | .050 | .064 |
| WALL, $t_w$ (cm) | .079 | .079 | .079 | .079 | .079 |
| Σ m; (g/cm$^2$) | .387 | .391 | .391 | .348 | .384 |
| Σ$t$S; (cm) | 15.24 | 10.16 | 10.16 | 7.62 | 7.62 |
| VELOCITY, $V_p$; (km/s) | 6.19 | 6.60 | 6.55 | 6.15 | 6.14 |
| WALL, $Y_w$; (N/m$^2$) | 2.76 × 10$^8$ | 2.76 × 10$^8$ | 2.76 × 10$^8$ | 2.76 × 10$^8$ | 2.76 × 10$^8$ |
| WALL CONDITION | FLAT; INTACT | MINIMUM DIMPLE; INTACT | MINIMUM DIMPLE; INTACT | DIMPLED; PERFS & TEARS | DIMPLED; INTACT |
| | #732 | #624 | #727 | #726 | |

TABLE 3-continued
COMPARISON OF SIGNIFICANT cm HYPERVELOCITY NEXTEL DATA
PROJECTILE: 2017 ALUMINUM

| | | | | |
|---|---|---|---|---|
| SHIELDS, n (g/cm²) | 4 × .055 | 2 × .086 | 2 × .110 | 2 × .128 |
| $m_{sl}/(pd)_p$ | .064 | .100 | .128 | 148 |
| WALL, $t_w$ (cm) | .064 | .127 | .127 | 127 |
| Σ m; (g/cm²) | .397 | .525 | .573 | .609 |
| Σ$l$'S; (cm) | 10.16 | 5.08 | 5.08 | 5.08 |
| VELOCITY, $V_p$: (km/s) | 6.15 | 6.60 | 6.14 | 5.93 |
| WALL, $Y_w$: (N/m²) | 1.24 × 10⁸ | 3.45 × 10⁸ | 3.45 × 10⁸ | 3.45 × 10⁸ |
| WALL CONDITION | DIMPLED; INTACT | DIMPLED; INTACT | MINIMUM DIMPLE; INTACT | MINIMUM DIMPLE; PERF 1 mm |

We claim:

1. A hypervelocity impact shield for protecting a wall structure from impact with particles of matter having impact velocities up to 16 km/s and densities of about 2.7 g/cm³, said impact shield being mounted over said wall structure in a position to intercept said particles of matter and comprising an array of ultra thin sheets of impactor disrupting material, means for supporting and maintaining said sheets in a spaced relationship to one another and to said wall where the outermost sheet of impactor disrupting material which is first impacted by said particle of matter produces fragmentation and scattering of the impacting material and a debris plume of liquid and vapor from the impacting material and the sheet material, and where each of the sheets between the outermost sheet and the wall structure has a thickness such that the ratio of sheet thickness to the diameter of said particles of matter which may be of spherical form or to the length of cylindrical particles of said matter is in the range of 0.03 to 0.05 and wherein the spacing between adjacent sheets is arranged so that the debris plume resulting from impacting material penetrating a sheet does not puncture the next adjacent sheet prior to the arrival of material and shield particulates at such adjacent sheet, said sheets being of a number and spacing such that said impacting material and the resulting particulates thereof are successively impact shocked by the sheets to a state of total melt and/or vaporization prior to reaching said wall structure.

2. A hypervelocity shield as recited in claim 1 wherein the number of said sheets and the spacing between each pair of adjacent sheets and between the wall structure and the sheet adjacent thereto are sufficient to produce a total melt and degree of vaporization of all the impacting matter and sheet material particulates as will preclude a perforation of said wall structure.

3. A hypervelocity impact shield for protecting a spacecraft wall structure from impact with particles of orbital debris having densities of about 2.7 g/cm³ and velocities up to 16 km/s relative to said spacecraft, said shield comprising an array of ultra thin spaced sheets of impactor disrupting material, means for mounting said shield to the wall structure and for supporting said sheets in uniform spaced relationship to one another, each of a thickness such that the ratio $t_s/d_p$ of sheet thickness $t_s$ to the diameter $d_p$ of said particles which may be of spherical form is in the range of 0.03 to 0.05 and wherein the spacing between the sheets is such that each sheet is intact when the material from one of said particles and the fragments resulting from a previous impact are intercepted, said sheets being of a number n with a spacing therebetween such that $$\{\Sigma l^n t_s + t_w\} = \frac{C_1 \times M_p \times V_p}{(\Sigma l^n \Delta S)^2} \times \left[ \frac{2.76 \times 10^8}{Y_t} \right]^{\frac{1}{2}} \text{ cm}$$

and $$t_w = \frac{C_2 \times M_p \times V_p}{(\Sigma l^n \Delta S)^2} \times \left[ \frac{2.76 \times 10^8}{Y_t} \right]^{\frac{1}{2}} \text{ cm}$$

where
$t_w$ = thickness of the wall structure in cm,
$m_p$ = mass of an impacting particle of orbital debris in g/cm²,
$V_p$ = velocity of the impacting particle of orbital debris relative to said wall structure in km/s,
$Y_t$ = yield stress of the wall material in N/m²,
and $C_1$ and $C_2$ are coefficients.

4. A hypervelocity impact shield as set forth in claim 3 wherein said sheets are of aluminum alloy.

5. A hypervelocity impact shield for protecting a spacecraft wall from impact with particles of orbital debris having densities of about 2.7 g/cm³ and velocities up to 16 km/s relative to said wall, said shield being mounted on said wall in a position to intercept said particles of orbital debris and comprising a plurality of very thin sheets of impact absorbing material mounted on said wall structure in a stacked arrangement and in spaced relation to one another, where that outermost sheet of impact absorbing material first impacted by one of said particles of orbital debris causes the fragmentation and scattering of projectile fragments, each of said sheets being of a thickness such that the ratio of sheet thickness to the diameter of spherical particles of said orbital debris is in the range of 0.03 to 0.05 and wherein the spacing between the sheets is sufficient to insure that the debris plume resulting from impact of a particle of orbital debris with a sheet does not destroy the next adjacent sheet, said sheets being of a number n, each with a mass m and having spacing S therebetween such that $$\{\Sigma l^n m_s + m_w\} = \frac{C_3 \times M_p \times V_p}{(\Sigma l^n \Delta S)^2} \times \left[ \frac{2.76 \times 10^8}{Y_t} \right]^{\frac{1}{2}} \text{ gm/cm}^2$$

and

-continued $$m_w = \frac{C_4 \times M_p \times V_p}{(\Sigma f^n \Delta S)^2} \times \left[\frac{2.76 \times 10^8}{Y_t}\right]^{\frac{1}{2}} \text{gm/cm}^2$$

where
- $m_s$ = mass per unit area of the sheet material in g/cm$^2$,
- $m_w$ = mass per unit area of the wall in g/cm$^2$,
- $M_p$ = mass of the impacting particle of orbital debris in g/cm$^2$,
- $V_1$ = velocity of the impacting particle of orbital debris relative to said wall in km/s,
- $Y_t$ = yield stress of the wall material in N/m$^2$,
- $C_1$ and $C_2$ are coefficients.

6. A hypervelocity impact shield as set forth in claim 5 wherein said sheets are formed of a ceramic fabric of continuous polycrystalline metal oxide fibers.

7. A hypervelocity impact shield as set forth in claim 6 wherein said ceramic fabric fibers are $AL_2O_3$, $B_2O_3$ and $S_iO_2$.

8. A hypervelocity impact shield as set forth in claim 7 wherein said $AL_2O_3$, $B_2O_3$, and $S_iO_2$ fibers represent 62%, 14% and 24%, respectively, by weight of said sheet material.

9. A method of protecting a wall structure from damaging impact with hypervelocity particles, said method comprising disposing a series of impactor disrupting sheet materials in a stacked spaced array where the ratio of sheet thickness to the diameter of the particles of spherical form or to the length of cylindrical particles is less than 0.05 inch before said wall structure and in an intercepting position with respect to said particles of matter;

causing said array to intercept said particles of matter; and successfully shocking an impacting particle and progressively raising its thermal state to a molten or vaporized condition prior to contact with the wall structure.

10. The method of claim 9 wherein the impactor disrupting sheet materials has at least the same density as the impacting particles.

* * * * *